INVENTOR.
JAMES A. OGLE
BY Lawrence R. Brown
ATTORNEY

INVENTOR.
JAMES A. OGLE
BY Laurence R. Brown
ATTORNEY

April 25, 1961

J. A. OGLE 2,981,140

MULTIPLE IMAGE DISPLAY SYSTEM

Filed April 24, 1956

3 Sheets-Sheet 3

INVENTOR.
JAMES A. OGLE
BY
Laurence R. Brown
ATTORNEY

United States Patent Office 2,981,140 Patented Apr. 25, 1961

2,981,140

MULTIPLE IMAGE DISPLAY SYSTEM

James A. Ogle, Paoli, Pa., assignor to Burroughs Corporation, Detroit, Mich., a corporation of Michigan Filed Apr. 24, 1956, Ser. No. 580,381

4 Claims. (Cl. 88—1)

This invention relates to display systems and more particularly to optical display systems and methods for presenting a plurality of images from a visible planar record at a single display panel position.

In operation of certain electronic computers requiring human operator-response during the computation cycle, indications of the state of the computer must be indicated to the operator to form a basis for the reasoned human intervention in the computer calculations. Such decisions must be quickly made and since many different types of indications may occur, the chance for error is high if an operator must from memory decode indicator position into the proper message. Thus, a single display at a single panel position is preferable for reading directly certain numerals or lettered commands in terms of concisely worded messages. A centralized display panel of this sort takes up an area much smaller than an array of lamps, pointers, or other indicators for a corresponding number of messages.

It is important in producing a plurality of images at a single position to reduce the interference between the different images. This is difficult with conventional techniques, particularly where a selection of more than two images is necessary. Likewise, where planar photographic images are used for containing a plurality of more than two or three images, registration of the various elements used in recording and reproducing the images has been extremely difficult in prior art devices because of the necessity for relative motion between variout system components or observer angles.

Thus, although it is known that the presentation of multiple pictures from a planar photographic record by means of a multitude of tiny lenses (lenticules) has been made possible with such prior art devices as described in the United States Patent No. 1,984,004 issued to Ernest Wildhaber, these devices have not produced the required high contrast, non-critical dimensioning in both reproduction and recording, and freedom from interference or "ghosting" desirable when presenting more than two or three images.

Accordingly, it is an object of my invention to provide improved display systems and methods for reproducing multiple images from a planar transparency record.

A further object of the invention is to produce a plurality of images from a single planar photograph by a single non-critical selection technique obviating the requirement of relative motion and critical registration of precision built parts.

Another object of the invention is to provide multiple image display systems presenting good contrast.

A still further object of the invention is to produce a multiple lens system for selectively presenting minute areas throughout a picture area wherein cross talk between lenses and light spillage from selected picture areas is minimized.

A further object of the invention is to provide an improved non-critical lenticular assembly for producing multiple images from a single photographic plate comprising a partly exposed photographic film having non-adjacent pre-disposed recording areas.

In accordance with the subject invention, therefore, a display device is constructed with thin lenticulated optical sheets forming a lenticular array for focusing light from selected ones of a plurality of small lamps arranged in a two dimensional array or, in alternate verbiage, an array along two axes, upon corresponding messages recorded upon discrete areas dispersed throughout a planar photographic picture. Each lamp may be switched on to select a corresponding one of the recorded messages, and in this manner many messages may have spots recorded in different areas. The number of lamps in the array determine the number of possible selections which may typically be 16, 20 or 36 lamps. To improve the contrast available when selecting a large number of images on a single photographic plate, image areas are pre-recorded of larger size than the area of the later reproduced light images.

In accordance with other phases of the invention, light spillage onto non-selected recording areas (ghosting) is decreased considerably by providing dark images on light background, and by providing a relative orientation of recording areas, lenses and light sources together with non-contiguous recording area patterns so that light spillage is directed to non-recorded areas of the photograph.

Other objects and features of the invention will be found throughout the following more detailed explanation of the invention and its mode of operation which is referred to the accompanying drawing wherein:

Figs. 8 to 12 are detailed partial views showing the optical arrangement of lens and selection lamp arrays used in accordance with the invention in which:

Figs. 8 and 9 are respectively overall and enlarged plan views of a portion of the lens array as shown in Fig. 1 wtih typical ray paths, Fig. 10 is a side view of a portion of the lens array as shown in Fig. 1, Figs. 11 and 12 are respectively enlarged side and plan views of the lenticule arrays shown in Fig. 1;

Figures 1, 2, 3, 4, 5:
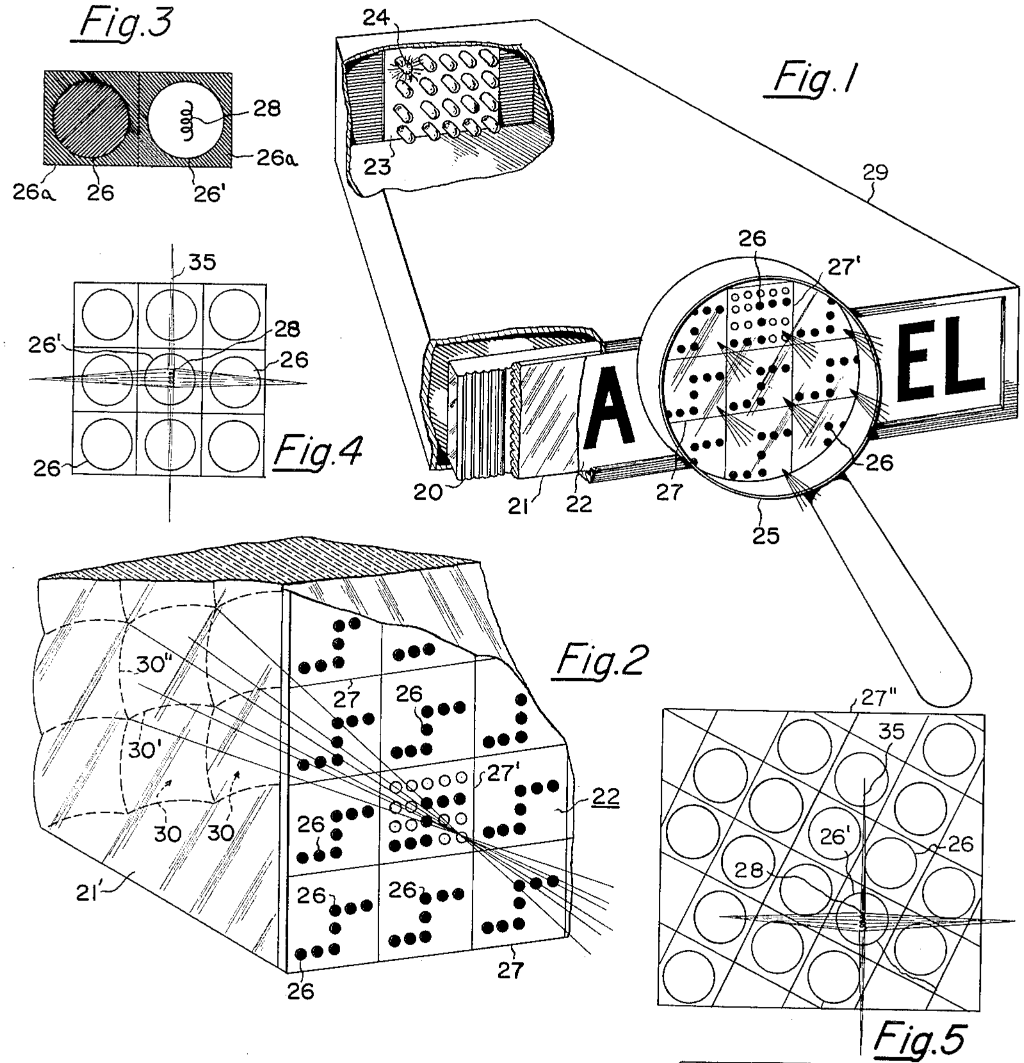
Fig. 1 is a perspective view partially in section of a display system constructed in accordance with the invention.
Fig. 2 is an enlarged sectional view in perspective of a portion of a display system utilizing spherical lenticules.
Fig. 3 is an enlarged partial view of a transparency prepared in accordance with the invention.
Figs. 4 and 5 are enlarged views of images presented upon a recording surface.

In Fig. 1 a manner of presenting a multiplicity of images at a single display panel from a planar transparency image is illustrated as afforded by the present invention. In this display system a pair of thin lenticulated sheets 20 and 21 are provided, respectively comprising horizontally and vertically disposed plano-convex lenticular arrays. Lenticular arrays are herein defined as lens arrays wherein the lenses have such small dimensions that they may focus on single elemental picture areas small enough and close enough to another picture area that they are merged by the eye into a complete uninterrupted image as distinguished from the Rayleigh criterion.

Disposed in front of the lenticular array 21 is a photographic transparency sheet or equivalent film 22, which has a plurality of images separately selectable by means of illumination by one of the lamps in the panel 23 such as the enregized lamp 24'.

The general message display assembly consists principally of an array of small filament-type lamps, the double lenticular plate 20—21 to which is affixed a photographic transparency 22 containing all the messages to be displayed, and a light-tight enclosure 29. The lamps are at a panel 23 in the rear of the enclosure 29 at a predetermined distance behind the lenticular plates. There are as many lamps as there are exposed messages on the film 22. Whenever a lamp is lighted, the message associated with that lamp appears on the screen with good contrast and sharpness. When a lamp is extinguished and a new one turned on, the message previously displayed vanishes and a new one appears in its place with equal clarity. Messages not in use do not materially affect the one being displayed. The illustrated model is capable of displaying twenty preselected messages; however, it is conceivable that with similar techniques as many as a hundred messages could be shown. Thus, the two dimensional (4 x 5) array of lamps shown in Fig. 1 provides for a selection of twenty different images, one of which is typified by illumination of lamp 24 in the upper left hand corner of the array. To illustrate the manner in which the image is formed, a section of the image is shown in considerably enlarged condition by the magnifying glass 25 to display the elemental recording spots of areas 26 of each image zone 27, in which the darkened spots of the typical zone 27' signify opaque areas and the circles indicate recording spots which are transparent.

Figure 6:
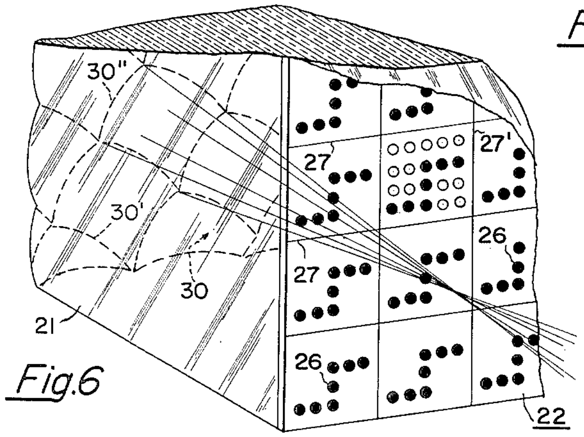
Figs. 6 and 7 are respective perspective and elevation views of portions of the display system modified for improved operation as afforded by one aspect of the invention.

A detailed view of the lenticular message display is given in Figs. 1, 2 and 6. The heart of the system is the lenticular plate, an assembly of two crossed cylindrical lenticular plates 20, 21 or equivalent spherical lenticular plate 21'. Each plate consists of a glass plate about 1/16 of an inch thick, to which is laminated a .005 inch embossed plastic sheet of optically refracting material having 60 cylindrical ribs (plano-convex lenticules) per lineal inch. In contact with the lenticules of the first plate 20 are those of the second plate 21 with axes horizontal. Together the horizontal vertical lenticules form the equivalent of a myriad of tiny sphericular lenses, such as 30 in Fig. 2, each of which is .016 inch square. For a reason to be disclosed later, a photographic emulsion is affixed to the exit surface of the glass plate facing the observer. The screen is then positioned forward of the lamp matrix at a distance calculated to provide optimum illumination whatever the position of the illuminator relative to the normal of the screen.

The successful operation of the lenticular message display is based on the fundamental principles of cellular optics, specifically the ability of each tiny sphericular lens to function independently of all others. Thus, whenever a lamp in the array behind the screen is lighted each sphericule focuses the incident parallel rays of light to a well defined spot in a focal plane 1/16 of an inch in front of it, or at the exit surface of the glass plate facing the observer. Since there are 3600 sphericules per square inch of display, a like number of point images per unit area are produced. The location of the image in an imaginary rectangular coordinate system placed in the focal plane of a single lens is dependent upon the angular position of the lamp with the respect to the normal at the center of that lens. Thus, the magnifier 25 in Fig. 1 shows that when the lamp 24 at the upper left corner of the matrix is lighted, each sphericule images the point near the lower right of its focal plane. If that lamp is extinguished and another turned on, an entirely new family of images is produced, none of which come to a focus at the points occupied by the lamp that was previously lighted nor at the points occupied by any other lamp. Since there are 20 lamps in the matrix and 3600 sphericules per square inch, 72,000 point images per unit area are formed, of which 3600 are used to record a single message.

Inasmuch as the lighting of any one lamp causes the display area to appear uniformly lighted, some form of light discrimination need be introduced to permit the display of individual messages. This requirement is satisfied by the photographic transparency, which as will be shown, permits or prevents the passage of light in accordance with the composition of each of the messages to be displayed.

To precompose a given set of messages, a photographic negative is made of each of the messages selected. The negative of a given message (in this case, transparent characters against a black background) is placed at the lenticular screen in front of the lamp array, and one of the lamps is turned on. Whenever the negative permits the passage of light a photographic emulsion at film 22 is exposed, but only at the specified focal points that are associated with the activated lamp. In other words, the exposure is a multitude of dots that pattern the letter or other image comprising the message. The bulb is then extinguished and the negative removed. A new negative is inserted and a different bulb lighted to produce an exposure pattern that conforms with the inserted message, but at points discrete from those used to record the previous message. When all the lamps have been used successively with given messages, the photo-emulsion is developed. Wherever exposure took place, black dots are formed with the remaining areas being transparent. The overall appearance is comparable to that of a halftone negative.

After development, the screen is mounted in the display unit. Now when one of the lamps is lighted, the message associated with that lamp will appear, since all rays from that lamp follow the same path they traversed at time of exposure. The message will appear black on a lighted background, because of the black dots, which were formed originally by the admission of light, now prevent its passage. Consequently, the message is displayed in reverse of the stencil from which it was made. Lighted messages on a dark background are formed when the stencil used in composing messages displays a black message on a transparent background.

As indicated by the rays emanating from the various zones 27, a selection of one spot in each zone is made by illumination of a given lamp associated with a corresponding recording area of each zone because of the lenticular array 20—21. As shown by the glass 25, the particular chosen areas appear on the light background area portion where the selected recording areas are transparent. However, the rays would fail to penetrate an opaque recorded area. In general, the larger background areas are made transparent for the purpose of improving ghosting problems, as will be understood more clearly from a discussion of interference patterns hereinafter presented.

By merging a great number of zones in which the rays from the selected lamp are directed to a corresponding recorded area by a lens portion of the lenticular array, an image of good contrast is viewed upon the photographic sheet 22. It is preferable to superimpose upon the photographic sheet 22 a diffuser such as two sheets of plastic with mat surfaces contiguous and polished surfaces outside.

The lens array 20—21, having two corrugated surfaces with small convex cylindrical lenses, normally disposed, acts as a sheet of small spherical lenses and this may be replaced, if desired, by an array of spherical lenses 30 as shown by Fig. 2, wherein a plano-convex refracting plate 21 has such thickness that the plane face is separated from the spherical lenses by the focal distance so that a photographically sensitive emulsion or image film 22 may be directly affixed to the plane face. Each lens has a generally horizontal boundary 30′ and vertical boundary 30″ which together form a set of axes designating the orientation of the lens array. Each of the spherical lenses 30 acts to focus light rays upon one of the corresponding zones 27 from a light source found in a particular position as illustrated by the selected lamp 24 in the bank of lamps of Fig. 1. Light rays emanating from another source position would result in the selection of another recorded area 26 in the zones 27 in a position corresponding to the direction of incident light.

Although approximate dimensions of the array of Fig. 1 for obtaining reasonable results are discussed it is to be recognized that those skilled in the art may change the system optics and dimensions without necessarily departing from the spirit or scope of this invention.

The lenticular array comprises two plastic sheets with parallel convex cylinders formed 60 to the inch. The sheets are placed about six inches from the point light source (lamp filament). The images are formed in a plane approximately one-sixteenth of an inch in front of the lenses. A diffusion device placed immediately in front of the image serves to increase the audience angle somewhat.

When composing a given set of messages, a photographic emulsion having pre-exposed interstices is placed at the image plane in accordance with this invention. As illustrated by the magnified recording area view of Fig. 3, the pre-disposed recorded areas 26 between the opaque interstices 26a are made larger than the reproduced image 28 of the lamp source in the selected area 26′. By this means greater contrast is made available in the reproduced images because of the tendency for some diffusion beyond the actual image which is confined to the opaque pre-recorded areas 26. This recording may be accomplished as hereinafter described by changing the lamp size for recording and reproduction or by changing the dimensions of light slits afforded in masks provided for the two corresponding operations.

In Fig. 3 the prerecorded interstices serve to decrease interference between pictures and make registration and light angle selections less critical. Each recording area 26′ thus is non-contiguous to any other recording area and occupies only a portion of the total plate surface available for each elemental image spot. This spot area selection is made by pre-exposing the emulsion with an appropriate mask placed between the light source and the emulsion so that in general the interstices are opaque to prevent the possibility of light passing through an unwanted position due to slight misregistrations, etc. As may be seen from the discussion of Figs. 4 to 7 hereinafter, the feature of providing non-contiguous recording areas also offers a means for decreasing a phenomena known as "ghosting."

As seen from Fig. 4, there is a tendency because of the crossed cylindrical lenses to cause the image 28 of the lamp filament to be spread out horizontally and vertically in the shape of a four pointed star 35 extending beyond the confines of the selected spot 26′. Since the recorded areas 26 adjacent the selected recorded area 26′ have information recorded thereon, this results in interfering images of less intensity which visually appear as ghosts alongside the actual image. Thus, even though the straying light is less bright, distortion of the image results with lenticular arrays having perpendicular axes. The overall effect is improved by always selecting the predominant background to be light, since only a reduction of contrast will then occur which is hardly noticeable to the eye because of the relative change of brightness from strong light to slightly stronger.

However, should large opaque areas occur, the difference becomes highly noticeable. Accordingly, it is desired to reduce the ghosting by arranging the system to produce a display such that the straying light from the star 35 is interposed between recorded areas as shown by Fig. 5. This may be accomplished by a relative change in the axis orientation of the lens arrays, the lamps or ther ecording areas, when the recording areas are noncontiguous with opaque interstices as provided in Fig. 3.

Thus, as seen in Fig. 6, by changing the orientation of the boundaries 30′ and 30″ of lenses to the proper angle with respect to the orientation of the zones 27 upon the photographic sheet 22, the star 35 (Fig. 4) for any particular selected spot may be oriented to cause the unwanted light to fall within non-recorded areas when the non-adjacent areas of the present invention are provided as illustrated by Fig. 3. Likewise, as indicated specifically by Fig. 5, the same effect may be accomplished by placing the pre-recorded spots 26 of each zone in such a pattern that the recorded areas do not interfere with the unwanted light from the star 35. In case of a change in orientation of the recording areas 26 in a different pattern, the lamp array 23 is arranged to provide the matrix of lamps 24 in the proper positions for selecting the particular recording areas 26 of a corresponding zone. Thus, the array of lights indicated in Fig. 7 represents a change of orientation corresponding to the orientation of recording areas 26 as illustrated in Fig. 5.

Figure 7:
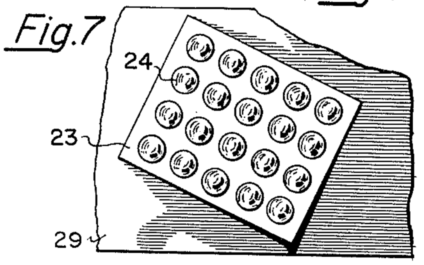

When it is desired to have the zones 27 in horizontal and vertical rows as shown in Fig. 2 while utilizing the features of Figs. 5 and 7, only those spots are used corresponding to those of the lamps 24 of Fig. 7 falling in positions such that they will select spots entirely within the desired zone positions. The general outside dimensions of Fig. 5 shows the confines of a zone 27″ oriented as shown in Fig. 2. Thus, with the lamp array of Fig. 7 as shown the lamps in the four corners would not be used, with the zone array of Fig. 5. However, with the corresponding orientation of zone axes, the maximum number of 20 recording spots per zone may be utilized for the embodiment disclosed herein.

Figures 8, 9, 11:
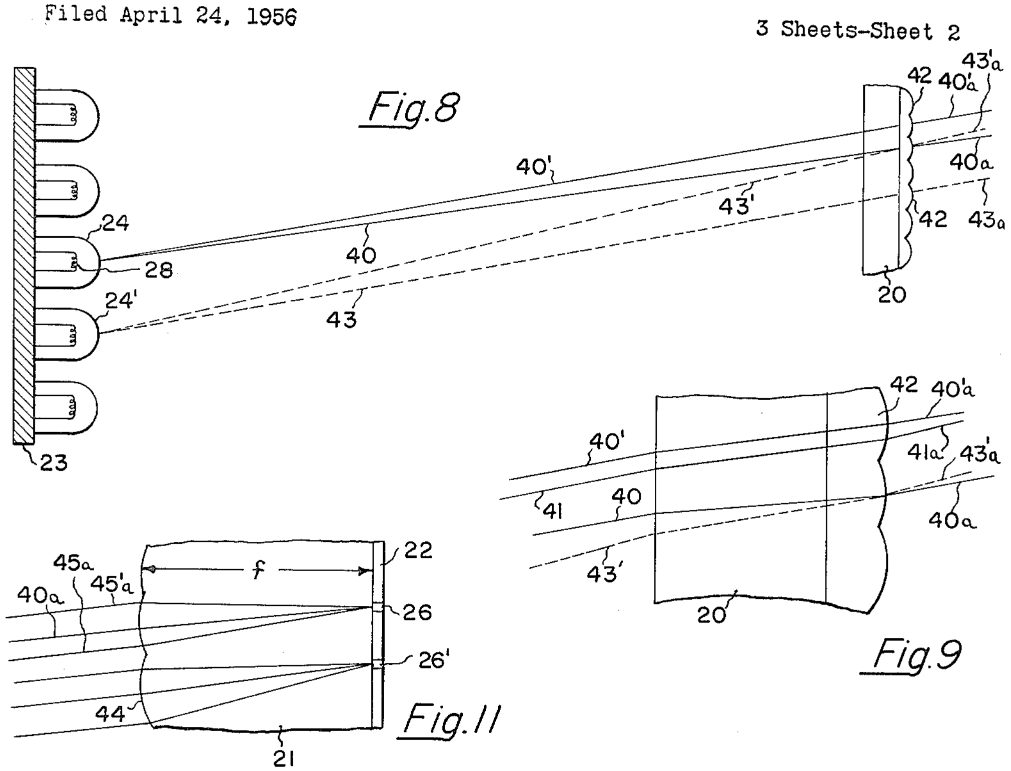

The optical selection of image patterns in accordance with the invention is illustrated by Figs. 8 through 13. From a consideration of these figures, the proper optical conditions for making a system operate in accordance with the teachings of this invention will be evident to those skilled in the art. The system is broken down into simplified figures for a more ready understanding of the involved factors, and these figures may be related to the overall system by similar reference character designations corresponding for example to the system aspect of Fig. 1. In Fig. 8, a top portion view of Fig. 1, therefore consider the action of the lenticular array 20 which effects the selection of a particular column of areas in response to the lateral displacement of a lighted lamp in one of the five columns of the lamp array 23. Thus, an incident ray 40 or 40′ is directed through the mid point of a respective rib 42 of the lenticular array 20 such that the exident path 40a or 40′a of the ray is directed by each individual lenticular rib 42 in a particular direction corresponding to the column positions of recording areas 26 in the respective zones 27 (Fig. 1). That ray which passes through the apex of the rib 42 is termed a chief ray, and thus rays 40 and 43 are illustrated to signify chief rays, whereas incident ray 41 of Fig. 9 indicates a ray which is not a chief ray since it passes through a curved portion of lens 42. The different incident rays from the respective lamps which strike the lens array 20 are designated by similar reference characters which are primed where they strike different ribs 42, and the exident rays corresponding thereto include the subscript $a$ to facilitate comparison.

In general, as shown in the enlarged detail view of Fig. 9 by the ray 41, each rib 42 serves to focus all rays from a selected lamp passing through the rib upon a focal point on the path of the chief exident ray 40a etc., and a film (22) is located at the focus point. As shown in Fig. 8 by an alternate incident ray 40' and exident ray 40'a, the effect of all rays emanating from a particular lamp is to provide parallel chief rays emerging from different ribs 42 of the lenticular array 20 at an angle corresponding to the position of the selected lamp. This may be seen by comparison of the dotted rays 43a. It is assumed that the distance from the lamp array 23 to the lenticular array 20 is such that incident rays are presumed generally parallel for the span of each of the small dimensional ribs 42.

To illustrate the difference in angular displacement afforded by selection of an alternate lamp 24', the dotted chief rays 43 striking the lens array 20 are shown to emerge at a different angle from that of the rays 40 from lamp 24 thereby serving to select different chosen lateral positions on a film or screen upon which the respective bundles of rays are focussed by the ribs 42. Thus, a lateral or columnar selection is afforded by action of the array 20 with the five columns of lamps as seen in Figures 1 and 8.

The enlarged portion view of Fig. 9 shows a more detailed action of the lenticular array 20 upon the incident rays 40 and 43 to produce corresponding exident rays 40a and 43a. This illustrates that the lenticular array 20 comprises a series of ribs 42 which are usual cylindrical lenses which act in a normal optical manner to refract the rays from the bank of lights 23 in such a direction that different angular positions are selected by rays emanating from different excited lamps 24. Thus, the lateral position selected by means of the incident rays 40 and 43 emanating from different selected lamps 24 and 24' respectively, are directed to different lateral recording area positions in each of the zones since a different lenticular rib 42 is provided for each column of recording zones 27. It is noted that in the overall assembly the further array 21 inserted in the exident ray path must be accounted for in arriving at any specified focal distance.

To show the columns of rays formed by the cylindrical ribs 42 of plate 20, an enlarged portion view of the plate 21 as seen from a side view of Fig. 8 is shown in Fig. 11 with a column of rays as seen in Fig. 8, shown as a plurality of separate rays 40a, 45a, etc. so that the chief ray 40a can be followed through to a specific vertical spot location 26 associated with the lateral selection afforded by lens array 20. Thus columns of parallel rays, etc. are formed by the cylindrical ribs 42 of plate 20 in Fig. 8 which by action of the cylindrical ribs 44 on the adjacent lenticular array 21 are formed into a series of discrete spots 26 on the photographic film 22.

The thickness ($f$) of plate 21 is such that the focal distance of the lenticular ribs 44 causes the rays to focus upon the film 22. However, the thickness of other plate 20 need not bear an optical relationship in the general case.

Figure 10:
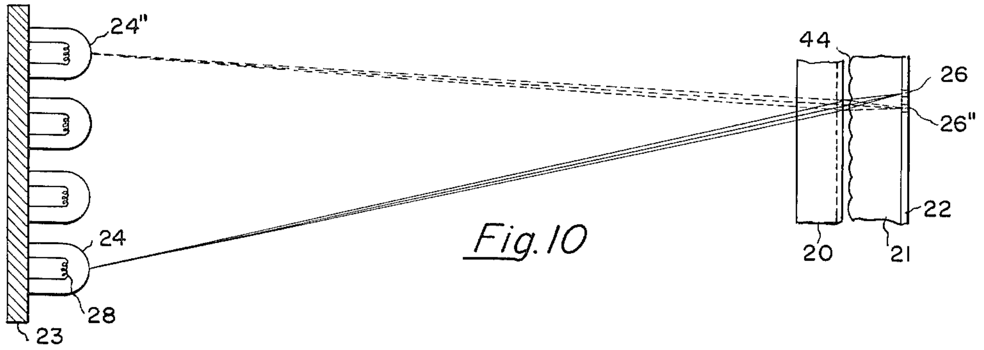

In a somewhat similar manner to the action of lens array 20, a vertical selection angle of the corresponding rows of recording areas of each zone is made from the array of lamps 23 in Fig. 10 so that the different vertical positions of the recording areas 26 or 26'', etc. upon the photographic film 22 of each zone 27 are selected by the lenticular array 21, as the lamps 24 and 24'' are selectively lighted. The actual dimensions of the lens ribs and rays are exaggerated to show the vertical selection features.

Figure 12:
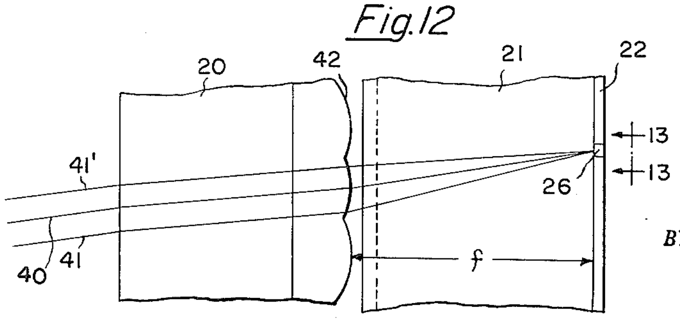
Figure 13:
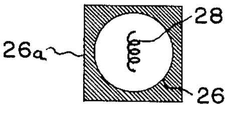
Fig. 13 is a typical recording area selected along the lines 13—13 of Fig. 12.

As seen by the combined partial view of Fig. 12, as would be viewed from the top of Fig. 10 or looking into the drawing of Fig. 8, the lamps 24 are placed a distance far enough away from the lenses that the incident rays 40 and 41 for any one rib are considered parallel, thereby resulting in columnar selection in separate directions by lenses of arrays 20 and 21. The action of the rays in two directions as shown in Figs. 10 and 12 result in compound refraction action in two coordinates which provides the same general function as a corresponding spherical lens and resulting in the projection of the image of the lamp filament 28 upon a single recording area 26 in a particular pre-designated area at a selected row and column intersection, as shown enlarged in Fig. 13.

In Fig. 12, it is seen that the focal action of array 20 serves to pinpoint the respective column positions on the film 22, thus, the distance ($f$) between the lenticular ribs 42 of array 20 and the film 22 should be such that rays are focussed upon the film 22. As hereinbefore explained, the spacing of recording areas in each zone is determined by the positions of the lamps; whereas the number of ribs on the lenticular arrays determines the number of zones. Also each zone is placed close enough to the adjacent zone so that light is merged by the human eye between the two selected recording areas of adjacent zones whenever it is desirable to get a visibly non-granular selection pattern on the film corresponding to a particular photographic image of the plurality of images recorded upon the film.

The spacing of the two lenticular arrays 20 and 21 is somewhat critical, because of the focal distance relationship. Also, because of the pre-recording of discrete noncontiguous areas 26 upon the photographic film 22, an array must be established so that registration between the lamps and the separately recorded photographic images is not an overcritical problem. This is particularly true because of the small dimensions involved in order to obtain a non-granular visible image. Accordingly, a lens array as shown in the plan and end sectional views of Figs. 14 and 15 respectively is provided for permitting proper processing of the photographic film in such a manner that the entire film may be pre-processed to provide the previously discussed non-contiguous recording areas 26 without conversely establishing intolerable registration problems. Thus, a unitary assembly of the lenticular arrays 20 and 21 together with the photographic emulsion 22 which may be pre-exposed is joined together to permit pre-recording in a standard reproduction jig for providing the non-adjacent recording areas and for establishing a particular set of selectable images in such a manner that ready assembly without critical registration adjustments in a remotely stationed reproducing system is feasible.

In general, the lenticular array 21 may be constructed by utilizing an ordinary photo-sensitive glass plate in which the antihilation layer on the surface opposite the photographic emulsion 22 is removed. An embossed plastic acetate sheet 45, about .005 inch in thickness and having 60 cylindrical ribs per linear inch, is then bonded to the surface of the plate opposite the emulsion 22. In the same manner, the array 20 is comprised of a simple glass plate with a similar bonded plastic sheet 46 provided with the cylindrical ribs oriented normally to those of the sheet 45. To mount the lens array in a unitary assembly, a layer of spongy paper or other inert material 47 of proper thickness is sandwiched around the outer edge between the glass plates of arrays 20 and 21. This allows the lens ribs to come into physical contact thereby assuring an even spacing throughout and closely establishing the focal distance relationship desired. Also this material 47 provides a barrier which permits injection of a bonding material 48 such as an epoxy casting resin which ties the two glass plates together and prevents intrusion of moisture or dust which would disturb the optical effect of the lens array. In general, the glass plate of array 21 is made with larger dimensions than that of plate 20 so that the bonding material does not creep around the edge of the array and react with the emulsion surface 22. The following characteristics of resin are desirable and are found in a commercially available resin known as Scotch Cast #2 produced by the Minnesota Mining and Manufacturing Company.

(1) The resin when set is not affected by the developer solution,
(2) It adheres properly to glass,
(3) It sets in a reasonable amount of time so that long manufacturing processing is not required,
(4) It is not subject to cold flow,
(5) It does not react with acetate or plastic material of which the lenses are formed, and
(6) It sets at low temperatures such as ambient temperatures so the processing does not disturb the photographic emulsion 22.

The casting resin may be administered with a hypodermic needle for example around the edges of the assembled glass plates.

Figures 16, 17:
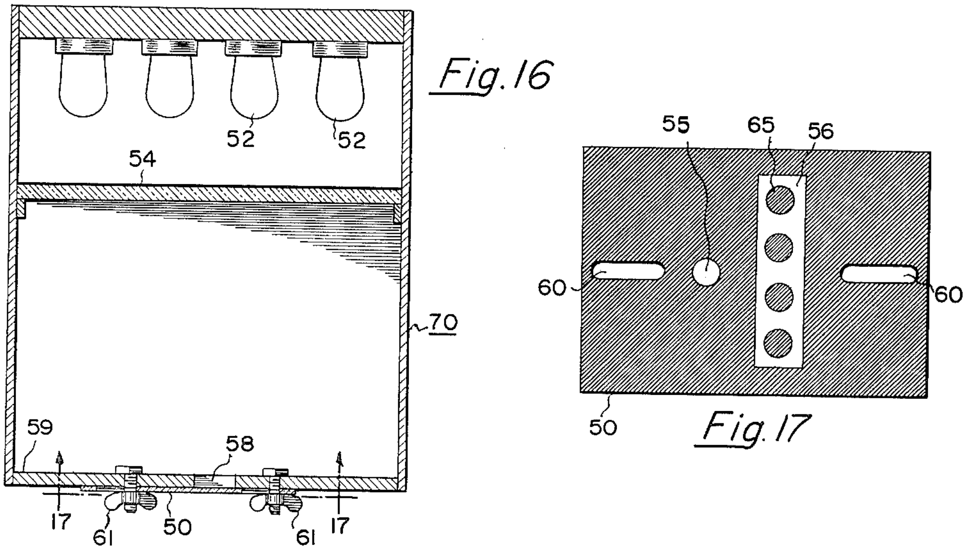
Fig. 16 is a sectional plan view of a light box developing system.
Fig. 17 is an elevation view of a mask presented along lines 17—17 of Fig. 16 for producing pre-disposed non-contiguous recording areas in accordance with the invention.
Figure 15:
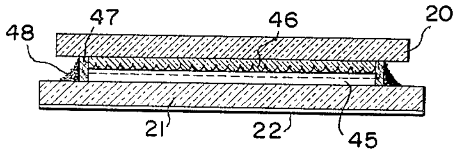
Figs. 14 and 15 are respectively plan and cross sectional views of a lens assembly constructed in accordance with the invention.

After the lens assembly is completed it may be assembled in the pre-recording or selection jig illustrated in Fig. 16 wherein the adjustable plate 50, as shown in Fig. 17, corresponds in general position to the matrix array of lamps 23 as shown in Fig. 1 with respect to an overall assembly relationship with the lenticular arrays. Thus, the lens array of Fig. 15 is positioned a proper distance from the plate 50 in the jig during the recording process. The bank of lamps 52 are arranged in the recording jig behind a diffusion plate 54 so that light will shine through the transparent areas 55 and 56 of the plate 50 through the aperture 58 extending through the generally positionable panel 59 of the jig array. Thus, by means of the selection slots 60 and the clamping screws 61, the two different transparent areas 55 and 56 may be presented to the diffused light emanating from the screen 54 for appropriate direction to particular recording areas upon the emulsion 22 of the lens array.

Figure 18:
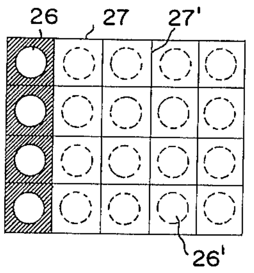
Fig. 18 is an elevational view of a photographic film prepared with pre-exposed interstices in accordance with the invention.

The function of the transparent area 56, with the darkened spot areas 65, is to pre-record the non-adjacent recording areas simultaneously in selected columns of all the respective zones 27 as shown by Fig. 18, so that non-adjacent recording areas 26 of the type hereinbefore discussed are provided. By means of suitable mechanical adjustments selected by means of detents or other mechanisms which are adjustable to the required mechanical tolerances, the panel 59 (or conversely the entire array 70) may be moved to various fixed positions corresponding to the respective columns of each recording zone in the case of the transparent member 56, and to positions corresponding to lamp positions for any of the selectable recording areas in a particular zone in case of the transparent member 55. Thus, when the transparent member 56 is placed in one movable position of the panel 59 and is adjusted to appear before the aperture 58, the film on the emulsion 22 will be exposed in the shaded areas of each zone 27 as shown in Fig. 18. Likewise, by moving the panel 59 to positions defining the other areas in the zone, or in the alternative by providing a larger mask encompassing the entire zone, the pre-recording of all non-adjacent discrete areas 26 upon the emulsion 22 may be accomplished in a precise manner.

Figure 14:
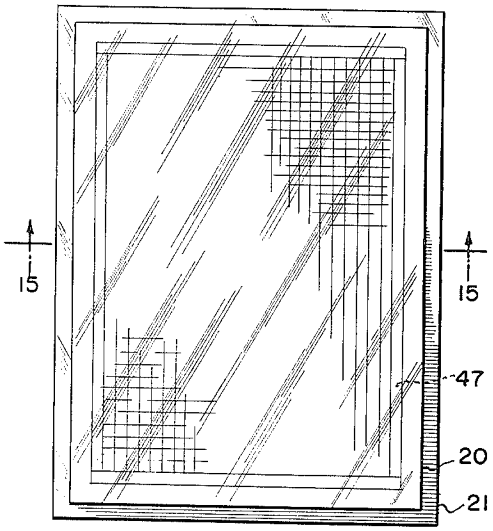

Likewise, should it be desired to blank out any one set of the recording areas, the transparent member 55 is used similarly, and each position then serves to select a particular recording area 26' of each of the zones of the emulsion 22. Thus, by moving the panel 59 to twenty different vertical and horizontal positions corresponding to the lamp matrix array 23 of Fig. 1, separate recordings might be made of all of the twenty receptive image positions of the particular described embodiment. Thus, while exposing the emulsion to each position of the transparent area 55, an image transparency such as a photographic negative may be inserted for recording a particular type of intelligence upon the corresponding recording areas 26 of each of the zones. It is evident that by this means a pre-recorded assembly may be made which is adaptable for clamping into a fixed jig in a system as shown in Fig. 1 so that undue mechanical tolerances are not required as would be necessary for separately mountable elements where it is required that each time a recording is mounted the lenses and lamps and image would have to be relatively adjusted for proper toelrances and correspondence to the exact array used in the pre-recording process. It is only required in the present system that the pre-recording jig 16 be made with the proper physical dimensions to correspond to a given set of lamps and spacing of reproduction areas as shown in Fig. 1. Thus a simple mounting of the assembly of Fig. 14 is sufficient for reproduction of a pre-recorded set of data and the image patterns may be readily interchanged without adjustment.

It is noted that the plate 50 has in the transparent area 56, the spots 65, which are opaque for preventing exposure of the recording areas 26 which are left on the emulsion in accordance with the teachings of the present invention. Accordingly, the areas of the opaque spots 65 are larger than the focussed image 28 (Fig. 3) of the selected lamp filaments in order to effect the desirable feature hereinbefore mentioned. However, the transparent member 55 is generally the same size as or larger than the opaque area 65 so that the recording of the different images tends to fill the entire available recording areas 26.

It will be recognized from the foregoing features described in connection with this present invention that certain embodiments have been made in the art of producing lenticular displays as defined with particularity in the appended claims.

What is claimed is:

1. An optical display system comprising in combination an array of separately controllable small-area light sources distributed along two-dimensional first axes; a light refractive lens system comprising an array distributed along two-dimensional second axes of light-converging refractive elements; each of said refractive elements having the properties of an imperfect converging lens which focuses each said small-area light source into a central spot with concentrations of aberrant light extending radially therefrom at azimuthal angles determined by the azimuthal angles of the said two-dimensional second axes; a mask located in the plane where said central spots are focused, the total surface area of said mask being divided into a plurality of substantially uniform contiguous surface areas, each of said contiguous areas comprising a recording zone surrounded by an opaque interstitial region, each recording zone being noncontiguous to any other recording zone, said mask containing in its recording zones the elements of a multiplicity of images, said recording zones being either opaque or transparent in accordance with the elements of the images stored thereby, the illumination of a given light source resulting in the impingement of a plurality of central spots on selected recording zones associated with a single one of said images, said opaque interstitial regions surrounding said selected recording zones associated with said single image tending to prevent the scattering of said aberrant light into non-selected recording zones.

2. An optical display device comprising in combination an array of small-area discretely controllable light sources, each said light source being located to include the intersection of one of a first set of parallel uniformly spaced coplanar axes with one of a second set of parallel uniformly spaced axes and coplanar with the first set of axes; a first substantially planar array of straight bounded converging lenses substantially parallel to each other and to the plane determined by the said first and second sets of axes, and a second substantially planar array, parallel to the said first array of lenses, of straight bounded converging lenses substantially parallel to each other and at right angles to the lenses of the said first array, said lenses and light sources being oriented with respect to each other such that the projection of the lens axes into the plane of the light source axes appears at an acute angle to said light source axes, the focal lengths of the lenses of the said first and said second arrays being such that together they focus light from a said light source in an image plane preponderantly in spots, the spacing of the said light sources being such that the said spots are separately distinct; a partly transparent and partly opaque mask located in the said image plane, containing in its transparencies and opacities a multiplicity of images, the transparencies and opacities located at the said spots illuminated by the operation of a given said light source belonging to a single image, the areas of the said mask not lying at the said spots illuminated by the operation of any said light source being opaque, the said acute angle between said lens axes and said light source axes being chosen such that the aberrant light scattered radially from the surface of a said converging lens falls chiefly upon the areas of the said mask not lying at the said spots illuminated by the operation of any said light source.

3. An optical display device comprising, in combination: an array of small-area discretely controllable light sources, each said light source being located to include the intersection of one of a first set of parallel uniformly spaced coplanar axes with one of a second set of parallel uniformly spaced axes coplanar with the said first set of axes and at an acute angle with the first set of axes; a first substantially planar array of cylindrical converging lenses substantially parallel to each other and to the plane determined by the said first and second sets of axes and a second substantially planar array, parallel to the said first array of lenses, of cylindrical converging lenses substantially parallel to each other and at right angles to the lenses of the said first array, the focal lengths of the lenses of the said first and said second arrays being such that together they focus light from a said light source in an image plane preponderantly in spots, the spacing of the said light sources being such that the said spots are separately distinct; a partly transparent and partly opaque mask located in the said image plane, containing in its transparencies and opacities a multiplicity of images, the transparencies and opacities located at the said spots illuminated by the operation of a given said light source belonging to a single image, the areas of the said mask not lying at the said spots illuminated by the operation of any said light source being opaque, the said acute angle between the said first set of axes and said second sets of axes whose intersections determine the location of said light sources being so chosen that the light scattered at right angles to a straight line lying in the cylindrical surface of a said cylindrical lens falls chiefly upon the areas of the said mask not lying at the said spots illuminated by the operation of any said light source.

4. An optical display device as claimed in claim 3, further characterized by the fact that the therein recited acute angle has a value of thirty degrees, and that one of the therein recited sets of parallel uniformly spaced coplanar axes is parallel to straight lines in the cylindrical surface of any lens in the therein recited first array of lenses.

References Cited in the file of this patent

UNITED STATES PATENTS

| | | |
|---|---|---|
| 1,862,847 | Draper | June 14, 1932 |
| 1,937,139 | Barclay | Nov. 28, 1933 |
| 1,984,004 | Wildhaber | Dec. 11, 1934 |
| 1,984,471 | Fischer | Dec. 18, 1934 |
| 2,144,649 | Eggert | Jan. 24, 1939 |
| 2,167,107 | Dvornik | July 25, 1939 |
| 2,174,003 | Ives | Sept. 26, 1939 |
| 2,351,034 | Gabor | June 13, 1944 |
| 2,371,120 | Blakely | Mar. 6, 1945 |
| 2,390,439 | Johnson | Dec. 4, 1945 |
| 2,588,373 | Erban | Mar. 11, 1954 |
| 2,794,977 | Stoddart | June 4, 1957 |
| 2,833,176 | Ossoniak | May 6, 1958 |

FOREIGN PATENTS

| | | |
|---|---|---|
| 421,231 | Great Britain | Dec. 17, 1934 |
| 661,951 | Great Britain | Nov. 28, 1951 |